(12) United States Patent
Rabhi (10) Patent No.: US 10,428,954 B2
(45) Date of Patent: Oct. 1, 2019

(54) FLUID-CUSHION SEALING DEVICE

(71) Applicant: Vianney Rabhi, Lyons (FR)

(72) Inventor: Vianney Rabhi, Lyons (FR)

( * ) Notice: Subject to any disclaimer, the term of this patent is extended or adjusted under 35 U.S.C. 154(b) by 277 days.

(21) Appl. No.: 15/010,437

(22) Filed: Jan. 29, 2016

(65) Prior Publication Data

US 2016/0223084 A1 Aug. 4, 2016

Related U.S. Application Data

(60) Provisional application No. 62/109,935, filed on Jan. 30, 2015.

(51) Int. Cl.
*F16J 15/40* (2006.01)
*F16J 15/44* (2006.01)
*F16J 9/12* (2006.01)
*F04B 53/14* (2006.01)

(52) U.S. Cl.
CPC ............. *F16J 15/40* (2013.01); *F16J 15/406* (2013.01); *F16J 15/441* (2013.01); *F02G 2250/03* (2013.01); *F04B 53/143* (2013.01); *F16J 9/12* (2013.01)

(58) Field of Classification Search
CPC ......... F16J 15/40; F16J 15/406; F16J 15/441; F16J 9/00; F16J 9/12; F02G 2250/03; F04B 53/143
See application file for complete search history.

(56) References Cited

U.S. PATENT DOCUMENTS

| | | | | |
|---|---|---|---|---|
| 9,784,268 B2* | 10/2017 | Rabhi | .................. | F04B 53/143 |
| 2015/0086399 A1* | 3/2015 | Rabhi | .................. | F04B 53/143 |
| | | | | 417/437 |
| 2015/0122117 A1* | 5/2015 | Jonsson | .................... | E21B 1/02 |
| | | | | 92/165 R |
| 2016/0252048 A1* | 9/2016 | Rabhi | ...................... | F02G 1/02 |
| | | | | 123/25 A |

FOREIGN PATENT DOCUMENTS

FR   2575260 A1 *  6/1986  ............... F16J 15/40

* cited by examiner

*Primary Examiner* — Nicholas L Foster
(74) *Attorney, Agent, or Firm* — Young & Thompson (57) ABSTRACT

The fluid-cushion sealing device (100) for a piston (101) moving in a cylinder (102) and defining with the latter a chamber to be sealed (104) includes: a continuous perforated ring (105) through the radial thickness of which passes a calibrated opening (111) and which is sealingly accommodated in a ring groove (109) provided in the piston (101) so as to define, with the groove (109), a pressure distribution chamber (119) connected to a pressurized fluid source (112), while an axially blind counter-pressure recess (115) is provided recessed on an external cylindrical ring surface (107) which faces the cylinder (102) and which the continuous perforated ring (105) includes, the calibrated opening (111) leading into the recess (115).

6 Claims, 7 Drawing Sheets

FLUID-CUSHION SEALING DEVICE

The present invention relates to a fluid-cushion sealing device.

Numerous technologies exist for producing a seal between a piston and a cylinder so as to prevent a pressurized gas from leaking between said piston and said cylinder.

Few pistons work without sealing segment, ring or device, since the absence of such devices leads to considerable leakage flows. In most cases it is therefore necessary to provide a sealing device for said pistons.

A distinction is made between sealing devices for pistons that work without oil which are referred to as "dry" and those that are designed to operate lubricated by oil inserted between the segment(s) or the ring(s) that constitute said devices, and the cylinder with which they cooperate.

The design of a sealing device for a piston results from a compromise between the degree of sealing that said device procures, the energy loss due to friction that it causes, and its useful life.

One distinguishes mainly two fields of use of sealing devices for alternating piston: compressors and motors.

The dry-air compressors are commonly used, since many applications do not tolerate any lubricant in the compressed air that they use. The pistons which equip the dry-air compressors are mainly equipped with sealing rings made of "Teflon," which is the trademark deposited by the American company "Dupont de Nemours" for polytetrafluoroethyle e, also called "PTFE." This polymer is heat stable, it has a high degree of chemical inertness and a high anti-adhesive power. However, PTFE has the disadvantage of a friction coefficient that is clearly higher than that of a cut-off segment whose lubrication is ensured in the hydrodynamic regime over most of its travel. To give the polymer an acceptable resistance to abrasion and an acceptable useful life, it is possible to use a fitter in the PTFE, which consists of hard grains and solid anti-friction grains such as, for example, ceramic or coke. In spite of these improvements, the lubricated cut-off segments that are made of cast iron or steel generally have a better durability than the devices made of PTFE.

In the field of alternating internal combustion heat engines, the rings made of PTFE with filler are rarely used, since it is possible to lubricate the cylinder of said engines with oil without detrimental effect on the operation of the latter. Consequently, it is preferable to opt for lubricated cut-off segments made of cast iron that generate less energy tosses due to friction and that have a better durability than the rings made of PTFE.

Depending on the application, a selection thus has to be made between a seating ring Which operates dry but which generates high losses due to friction and is less durable, and a metal cut-off segment lubricated with oil, which dissipates less energy due to friction, and whose useful life is longer. In practice, and in most cases, only the need to keep air dry and oil-free justifies the selection of a sealing ring that operates dry.

One also notes that, besides the need to keep the compressed air or the gas free of any presence of lubricant, some high-temperature applications are not compatible with lubrication itself. Indeed, beyond a certain temperature, the oil becomes cokefied and loses its lubricating properties in contact with the internal watt of the compressor and, in particular, its cylinder and/or its segments. The limit coking temperature of conventional mineral oils is between one hundred sixty and two hundred degrees Celsius. The synthetic oils that have the best performance in terms of this criterion have a limit coking temperature of approximately three hundred degrees Celsius, in the best case.

If the temperature reached during operation is even higher—for example, on the order of four hundred fifty to five hundred degrees Celsius—there is a risk of self-ignition of the oil contained in the air as occurs in diesel engines.

However, it would be advantageous to be able to produce eat engines equipped a pressure-release cylinder, a cylinder head and a piston crown that work at even higher temperatures, on the order of a thousand degrees Celsius and more. In this case, a Brayton cycle regenerative engine conventionally implemented with compressors and centrifugal turbines could be implemented using volumetric piston machines. The yield of such an engine can be significantly higher than that of the conventional alternative internal combustion heat engines with Otto or Beau de Rochas cycle controlled ignition, or diesel cycle compression ignition.

However, in such a text, the lubrication of a piston segment of a conventional internal combustion engine is impossible, since no oil can resist the e ed temperatures on the order of a thousand degrees Celsius or more without burning or cokefying instantly. Therefore, it is not possible to use a cut-off segment made of cast iron or steel, since said segment needs to be lubricated to operate. Similarly, it is impossible to provide a PTFE segment or similar segment whose melting point is at a temperature on the order of only three hundred thirty degrees Celsius.

In addition to the high operating temperatures, it would also be advantageous to be able to design, produce and market non-lubricated piston compressors that produce dry air and whose energy loss due to friction at the site of their piston sealing device is limited, in contrast to what a conventional PTFE ring allows.

It is for the purpose of pushing back the limits of the sealing devices, in particular for pistons of compressors and alternating engines, that the fluid-cushion sealing device according to the invention allows an operation that:
  has a particularly tight seal;
  requires no lubrication;
  generates minimal losses due to friction;
  is compatible with a piston and/or cylinder heated to very high temperature, on the order of a thousand degrees Celsius and more;
  does not come in contact with the cylinder and as a result is robust and durable.

One notes that the field of application of the fluid-cushion sealing device according to the invention can extend to any other linear and/or alternating machine and, in particular, to any gas jack, pressure amplifier or pressure accumulator, these examples being given on a non-limiting basis and, in general, to any apparatus whose energy performance and/or efficiency can be improved by said device or whose field of application can be extended by said device.

In most applications, the fluid-cushion sealing device according to the invention is intended to provide a gas-tight seal. However, in some applications said device can be used to provide a liquid-tight seal and thus become a fluid-cushion sealing device operating in the same manner and producing the same results. Sealing off a liquid by means of a fluid-cushion sealing device according to the invention can be of real advantage, for example, for certain piston pumps that are used particularly in industry.

The other features of the present invention are described in the description and in the secondary claims which are directly or indirectly dependent on the main claim.

The fluid-cushion sealing device according to the present invention is designed for a piston that can move in longitudinal translation in a cylinder and in the same axis as the latter, said piston and said cylinder defining, with at least one cylinder head, a chamber to be sealed, said sealing device including:

- at least one continuous perforated ring which comprises an internal cylindrical ring surface, an external cylindrical ring surface, and two axial ring surfaces, said ring being accommodated in at least one ring groove provided in the piston or in the cylinder, while said ring is capable of moving radially in the ring groove without being able to leave the latter;
- ring sealing means that produce a seal between each axial ring surface and the ring groove, so that the latter defines, with the continuous perforated ring, a pressure distribution chamber connected by a transfer circuit to a pressurized fluid source;
- at least one calibrated opening which passes right through the perforated ring in its radial thickness;
- at least one fluid-cushion carrying surface which the continuous perforated ring comprises, said carrying surface being arranged on the opposite side from the pressure distribution chamber.

The fluid-cushion sealing device according to the present invention includes an axially blind counter-pressure recess provided recessed on the external cylindrical ring surface in the case in which the ring groove is provided in the piston, so that the surface that is not occupied by the counter-pressure recess of the external cylindrical ring surface which receives said recess constitutes the fluid-cushion carrying surface.

The fluid-cushion sealing device according to the present invention includes an axially blind counter-pressure recess provided recessed on the internal cylindrical ring surface in the case in which the ring groove is provided in the cylinder, so that the surface that is not occupied by the counter-pressure recess of the internal cylindrical ring surface which receives said recess constitutes the fluid-cushion carrying surface.

The fluid-cushion sealing device according to the present invention includes a counter-pressure recess which consists of a counter-pressure groove of small depth more or less centered in the axial length of the external cylindrical ring surface or of the internal cylindrical ring surface which receives said recess, said counter-pressure groove being produced over the entire circumference of said external cylindrical ring surface or of said internal cylindrical ring surface.

The fluid-cushion sealing ring according to the present invention includes a calibrated opening which opens into the counter-pressure recess.

The fluid-cushion sealing device according to the present invention includes a calibrated opening which opens into the counter-pressure recess via a pressure distribution recess provided recessed at the bottom of said counter-pressure recess.

The fluid-cushion sealing device according to the present invention includes a pressure distribution recess, which consists of a pressure distribution groove more or less centered on the axial length of the external cylindrical ring surface or of the internal cylindrical ring surface which receives the counter-pressure recess, said pressure distribution groove being produced over the entire circumference of said external cylindrical ring surface or of said internal cylindrical ring surface.

The fluid-cushion sealing device according to the present invention includes at least one of the two axial edges of the external cylindrical ring surface or of the internal cylindrical ring surface on which the counter-pressure recess is provided, which ends in an edge plating clearance.

The fluid-cushion sealing device according to the present invention includes ring sealing means which consist of a ring sealing lip which is secured to the continuous perforated ring, on the one hand, and which establishes a sealed contact with the interior or the rim of the ring groove, on the other hand.

The fluid-cushion sealing device according to the present invention includes ring sealing means which consist of a thinned axial portion provided in the vicinity of at least one of the axial ends of the continuous perforated ring, said portion being sealingly secured to the ring groove and sufficiently flexible to allow the diameter of the continuous perforated ring to increase or decrease relative to that of said groove.

The fluid-cushion sealing device according to the present invention includes a continuous perforated ring which consists of a flexible material and which includes at least one circumferential ring spring which tends to reduce the diameter of said ring if the ring groove is provided in the piston or which tends to increase the diameter of said ring if the ring groove is provided in the cylinder.

The fluid-cushion sealing device according to the present invention includes a pressure distribution chamber which accommodates ring fluid dispersion means which force the ring fluid originating from the pressure transfer circuit to sweep the largest possible area of the internal cylindrical ring surface in the case in which the ring groove is provided in the piston or the largest possible area of the external cylindrical ring surface in the case in which the ring groove is provided in the cylinder, before escaping through the calibrated opening.

The fluid-cushion sealing device according to the present invention includes ring fluid dispersion means which consist of a dispersion plate accommodated at the bottom of the ring groove, at least one of the axial ends of said plate being provided with at least one lateral dispersion plate opening or groove which forces the ring fluid originating from the pressure transfer circuit to lead into the pressure distribution chamber through least one of its axial ends.

The fluid-cushion sealing device according to the present invention includes a ring groove which has a radial ring abutment which limits the penetration of the continuous perforated ring into said groove.

If the ring groove is provided in the piston, the fluid-cushion sealing device according to the present invention includes a pressure transfer circuit which consists of a pressure intake tub-parallel to the cylinder and secured to the piston, a first end of said tube leading into the interior of said piston while the second end of said tube opens, via a pressure chamber borehole in which it can move by translation longitudinally and sealingly, into a pressure chamber connected to the pressurized fluid source.

The fluid-cushion sealing device according to the present invention includes a pressure intake tube which is connected to the pressure distribution chamber by at least one radial pressure intake duct.

The fluid-cushion sealing device according to the present invention includes a pressure chamber which is connected to the pressurized fluid source by a proportional pressure non-return valve which allows the ring fluid to go from said source to said chamber but not from said chamber to said source.

The fluid-cushion sealing device according to the present invention includes a ring groove which accommodates an expanding spring which bears against said groove in order to exert a radial force on the internal ring cylindrical surface in the case in which the ring groove is provided in t piston or on the external cylindrical ring surface in the case in which the ring groove is provided in the cylinder.

The fluid-cushion sealing device according to the present invention includes an expanding spring which produces by contact a seal between the ring groove and the continuous perforated ring.

The fluid-cushion seating device according to the present invention includes an expanding spring which is provided with at least one fluid dispersion opening and/or with at least one fluid dispersion groove so as to constitute, with said opening and/or said groove, the ring fluid dispersion means.

The description below in reference to the appended drawings given only as non-limiting examples will make it possible to better understand the invention, its features, and the advantages that it is capable of procuring.

DESCRIPTION OF THE INVENTION

FIGS. 1 to 12 show a fluid-cushion sealing device 100 wherein the fluid can be air or a liquid, various details of its components, its variants, and its accessories.

The fluid-cushion sealing device 100 according to the invention is designed for a piston 101 which can move by longitudinal translation in a cylinder 102 and in the same axis as the latter, said piston 101 and said cylinder 102 defining, with at least one cylinder head 103, a chamber to be sealed 104.

As FIGS. 1 to 12 show, the fluid-cushion sealing device 100 according to the invention includes at least one continuous perforated ring 105 which comprises an internal cylindrical ring surface 106, an external cylindrical ring surface 107 and two axial ring surfaces 108.

The ring 105 is accommodated in at least one ring groove 109 provided in the piston 101 or in the cylinder 102, while said ring 105 can move radially in the ring groove 109 without being able to leave the latter.

One notes that if the ring groove 109 is provided in the cylinder 102, the piston 101 is a plunger piston.

One observes that in all the cases, the ring groove 109 directly or indirectly keeps the continuous perforated ring 105 axially secured to the piston 101, if said groove 109 is provided in the piston 101, or axially secured to the cylinder 102, if said groove 109 is provided in the cylinder 102.

Particularly in FIGS. 1 to 10, one sees that the fluid-cushion sealing device 100 according to the invention includes ring sealing means 110 which produce a seal between each axial ring surface 108 and the ring groove 109, no that the latter defines, with the continuous perforated ring 105, a pressure distribution chamber 119 connected by a transfer circuit 114 to a pressurized fluid source 112.

One will also note that the ring sealing means 110 can consist of an O-ring seal 132, a lip seal, a composite seal, or any other seal or sealing segment that in itself is known regardless of what the material or geometry may be.

It should also be noted that the internal cylindrical ring surface 106 or the external cylindrical ring surface 107 facing the ring groove 109 can be a non-cylindrical rotationally symmetrical shape, so that any thickness variations of the continuous perforated ring 105 are possible over its axial length, said ring 105 possibly being either a simple circular metal sheet deformed by burnishing or stamping, or a part produced by rolling, using any cutting or grinding tool, or any other electrochemical or other production method known to the person skilled in the art.

FIGS. 1 to 10 enable one to observe that the fluid-cushion sealing device 100 according to the invention includes at least one calibrated opening 111 which passes right through the continuous perforated ring 105 in its radial thickness. One notes that the first end of the opening 111 opens on the internal cylindrical ring surface 106, while the second end of said opening 111 opens on the external cylindrical ring surface 107.

In FIGS. 1 to 3, 5, 7 and 9 to 11 one also sees that the fluid-cushion sealing device 100 according to the invention includes at least one pressurized fluid source 112 from which a pressurized ring fluid 113 exits, the outlet of said fluid source 112 being connected to the pressure distribution chamber 119 by a pressure transfer circuit 114 so that the ring fluid 113 exerts a pressure on either the internal cylindrical ring surface 106, if the ring groove 109 is provided in the piston, or on the external cylindrical ring surface 107, if said ring groove 109 is produced in the cylinder 102.

One notes that the ring fluid 113 can equally be a gas or a liquid and that the pressure to which it is subjected is always greater than the pressure prevailing in the chamber to be sealed 104. As a consequence of the above, the diameter of the continuous perforated ring 105 increases under the action of the pressure of the ring fluid 113 due to the resilience of said ring 105 so that the external cylindrical ring surface 107 tends to approach the cylinder 102 if the ring groove 109 is provided in the piston 101, or the diameter of the continuous perforated ring 105 decreases due to the combined effect of its resilience and of the pressure of the ring fluid 113 so that the internal cylindrical ring surface 106 tends to approach the piston 101 if the ring groove 109 is provided in the cylinder 102.

One also notes that the diameter of the calibrated opening 111 is calculated so that, taking into consideration the flow rate of the ring fluid 113 originating from the pressurized fluid source 112, the pressure that said ring fluid 113 exerts—depending on the case, on the internal cylindrical ring surface 106 or on the external cylindrical ring surface 107—always remains greater than that prevailing in the chamber to be sealed 104.

One sees that the pressurized fluid source 112 can be a piston, vane, screw, or centrifugal pneumatic fluid compressor 120 or any other type of pneumatic fluid compressor known to the person skilled in the art, or a piston, gear, or vane type hydraulic pump or any other type of hydraulic pump known in itself. The pneumatic fluid compressor 120, which can be a hydraulic pump, may or may not cooperate with a pressure accumulator which in itself is known. It should be noted that a fine mesh ring fluid filter 138 can be mounted upstream or downstream of the pneumatic fluid compressor 120 so as to remove from the ring fluid 113 all particles exceeding a certain size before said fluid 113 is introduced into the pressure distribution chamber 119.

FIGS. 1 to 10 show that the fluid-cushion sealing device 100 according to the invention includes a continuous perforated ring 105 comprising at least one fluid-cushion carrying surface 116 arranged on the opposite side from the pressure distribution chamber 119.

The fluid-cushion sealing device 100 includes an axially blind counter-pressure recess 115 provided recessed on the external cylindrical ring surface 107 in the case in which the ring groove 106 is provided in the piston 101, so that the surface that is not occupied by the counter-pressure recess 115 of the external cylindrical ring surface 107 which receives said recess 115 constitutes the fluid-cushion carrying surface 116.

According to a variant, the fluid-cushion sealing device 100 can include an axially blind counter-pressure recess 115 provided recessed on the internal cylindrical ring surface 107 in the case where the ring groove is provided in the cylinder 102, so that the surface that is not occupied by the counter-pressure recess 115 of the internal cylindrical ring surface 106 which receives said recess 115 constitutes the fluid-cushion carrying surface 116.

One notes that the extent of the counter-pressure recess 115 can be of any dimension from the smallest, that is to say equivalent to the non-zero radius of the mouth of the calibrated opening 111, to the largest, that is to say just perceivably less than that of the external cylindrical ring surface 107 or of the internal cylindrical ring surface 106 which receives said recess 115. It is specified that the piston 101 can comprise n the vicinity of the lit groove 109 a decompression groove or slots or any other internal channel or channel with a surface of any type whatsoever that connects said vicinity to the chamber to be sealed 104.

In an embodiment variant of the fluid-cushion sealing device 100 according to the invention shown in FIGS. 1 to 10, the counter-pressure recess 115 can consist of a counter-pressure groove 117 of small depth more or less centered on the axial length of the external cylindrical ring surface 107 or of the internal cylindrical ring surface 106 which receives said recess 115, said counter-pressure groove 117 being produced over the entire circumference of said external cylindrical ring surface 107 or of said internal cylindrical ring surface 106, the annular surfaces that border said counter-pressure groove 117 constituting each a fluid-cushion carrying surface 116.

In another variant, shown in FIGS. 3 to 10, the calibrated opening 111 can lead into the counter-pressure recess 115 via a pressure distribution recess 125 provided recessed at the bottom of said counter-pressure recess 115.

FIGS. 3 to 10 moreover show that the pressure distribution recess 125 can consist of a pressure distribution groove 126 more or less centered on the axial length of the external cylindrical ring surface 107 or of the internal cylindrical ring surface 106 which receives the counter-pressure recess 115, said pressure distribution groove 126 being produced over the entire circumference of said external cylindrical ring surface 107 or of said internal cylindrical ring surface 106.

Figure 5:
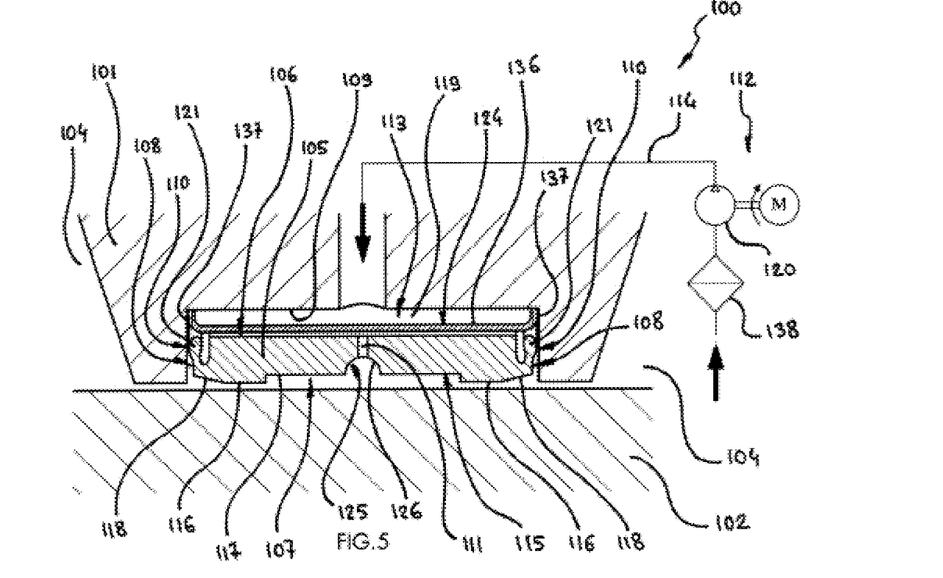
FIGS. 5 and 6 are a diagrammatic cross section and an exploded three-dimensional view, respectively, of the fluid-cushion sealing device according to the invention, a dispersion plate provided with lateral dispersion plate grooves being accommodated at the bottom of the ring groove, while a ring sealing lip secured to the continuous perforated ring constitutes the ring sealing means, and the continuous perforated ring comprises edge plating clearances.
Figure 6:
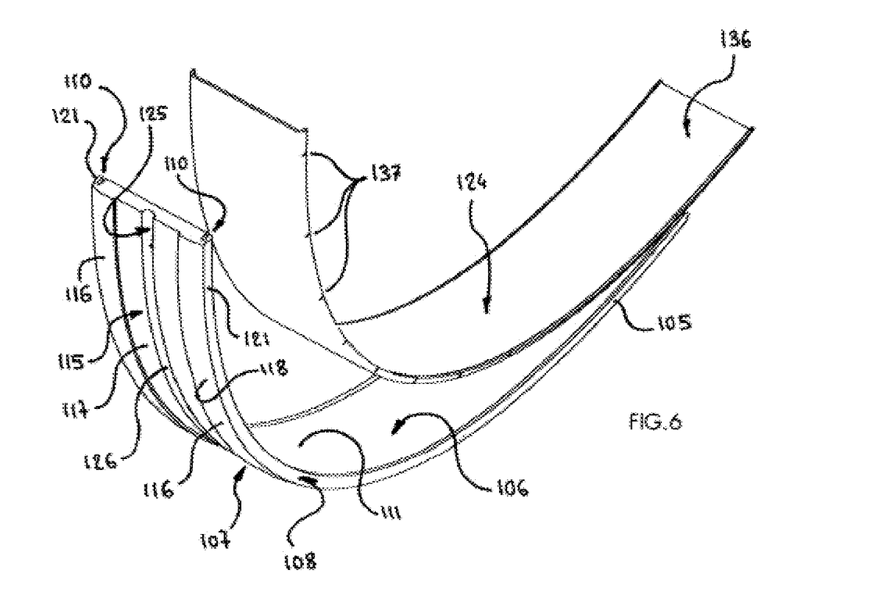

FIGS. 5 and 6 show, in addition, that at least one of the two axial edges of the external cylindrical ring surface 107 or of the internal cylindrical ring surface 106 which receives the counter-pressure recess 115 can end with an edge plating clearance 118 which allows the pressure of the ring fluid 113 which the pressure distribution chamber 119 contains to exert a locally higher force on the fluid-cushion carrying surface 116 which is juxtaposed to said edge plating clearance 118.

FIGS. 5 and 6 also show that the ring sealing means 110 can consist of a ring sealing lip 121 which is secured to the continuous perforated ring 105, on the one hand, and which establishes a sealing contact with the interior or the rim of the ring groove 109, on the other hand, wherein said sealing lip 121 can be can mounted as an added piece on the continuous perforated ring 105 or produced from the same piece of material as said ring 105. One notes that, alternatively, the ring sealing lip 121 can be secured to the ring groove 109, on the one hand, and establish a sealing contact with the continuous perforated ring 105, on the other hand. In this case, said lip 121 can either be mounted as an added piece on the ring groove 109 or on the rim of the latter, or it can be made from the same piece of material as said groove 109.

Figure 7:
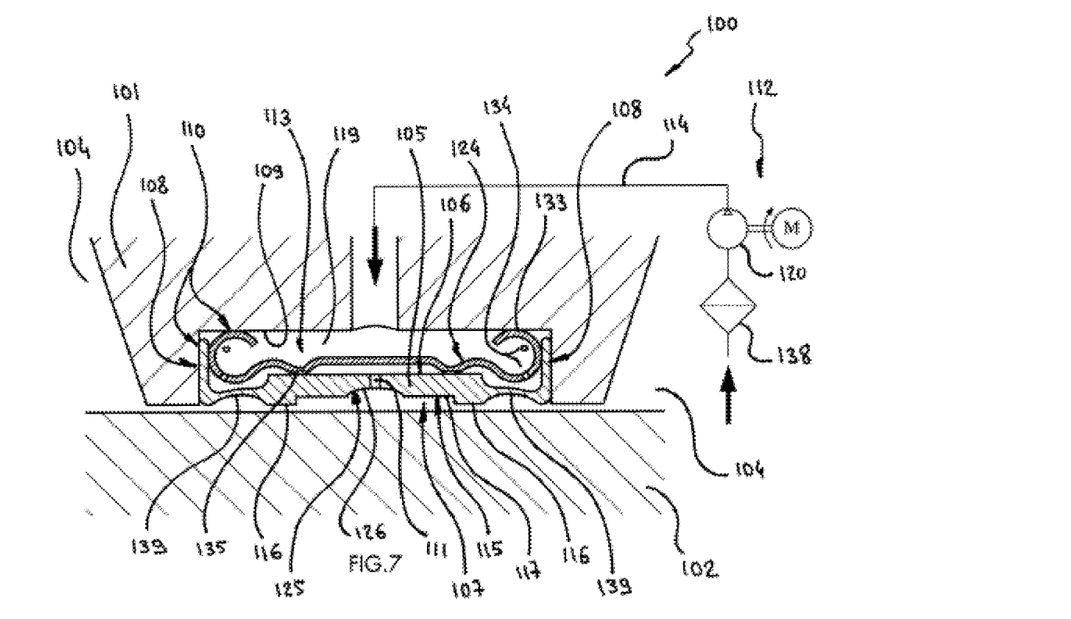
FIGS. 7 and 8 are a diagrammatic cross section and an exploded three-dimensional view, respectively, of the fluid-cushion sealing device according to the invention, the ring groove accommodating an expanding ring provided with fluid dispersion openings and with fluid dispersion grooves in order to constitute the ring fluid dispersion means, while the ring sealing means consist of thinned axial portions provided in the vicinity of the axial ends of the continuous perforated ring.
Figure 8:
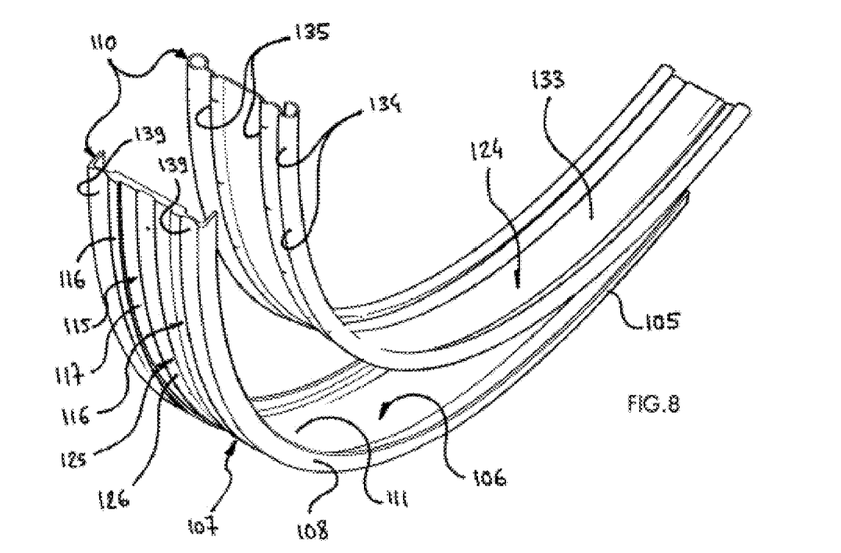

Another embodiment variant of the fluid-cushion sealing device 100 according to the invention is shown in FIGS. 7 and 8 according to which the ring sealing means 110 can consist of a thinned axial portion 139 provided in the vicinity of at least one of the axial ends of the continuous perforated ring 105, said portion 139 being sealingly secured to the ring groove 109 and sufficiently flexible to allow the diameter of the continuous perforated ring 105 to increase or decrease relative to that of said groove 109. One notes that the thinned axial portion 139 is designed so that the material which consitutes it in no case risks yielding either due to the effect of the pressure of the ring fluid 113 or due to a repeated stress that is incompatible with the fatigue resistance limits of said material.

Figure 1:
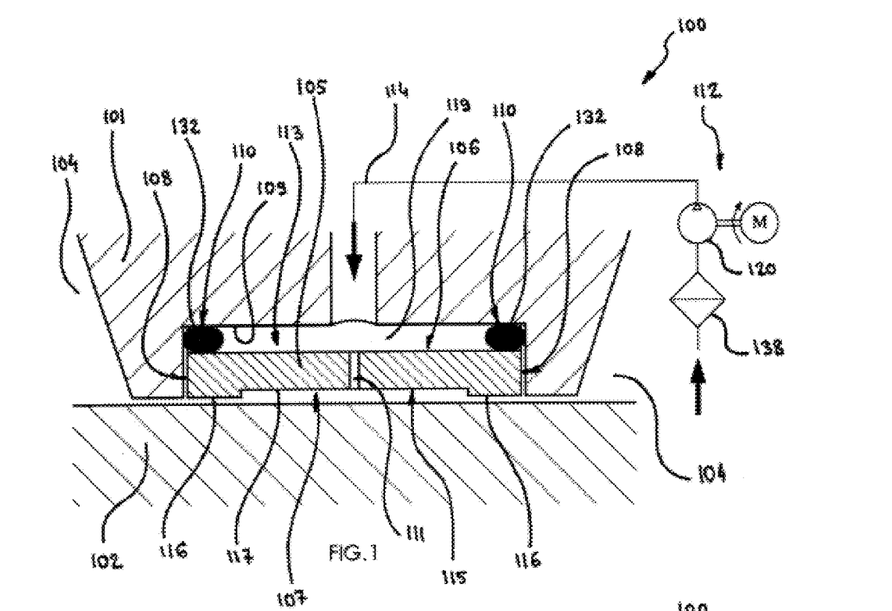
FIG. 1 is a diagrammatic cross-sectional view of the fluid-cushion sealing device according to the invention, the ring sealing means consisting of an O-ring seal.
Figure 2:
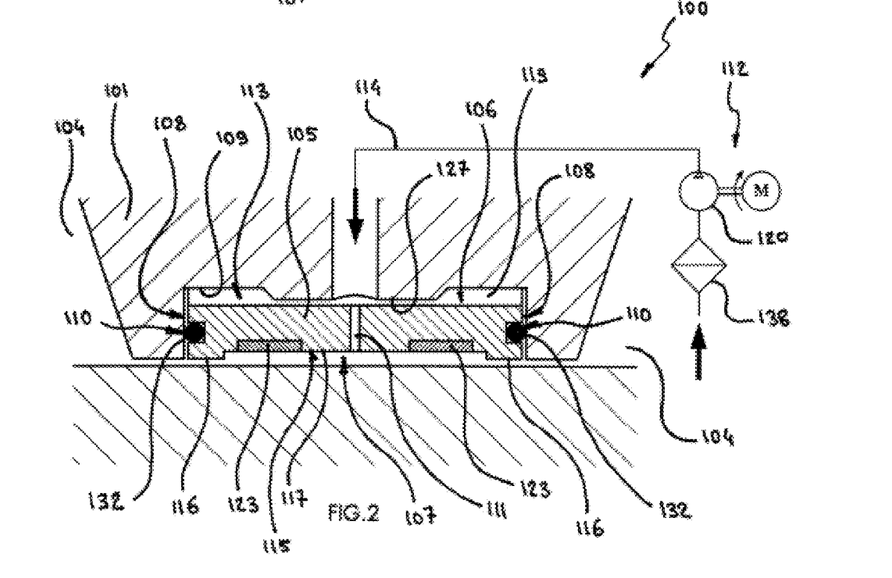
FIG. 2 is a diagrammatic cross-sectional view of the fluid-cushion sealing device according to the invention, the ring groove having a radial ring abutment which limits the penetration of the continuous perforated ring into said groove, while said ring consists of a flexible material and includes a circumferential ring spring.
Figure 3:
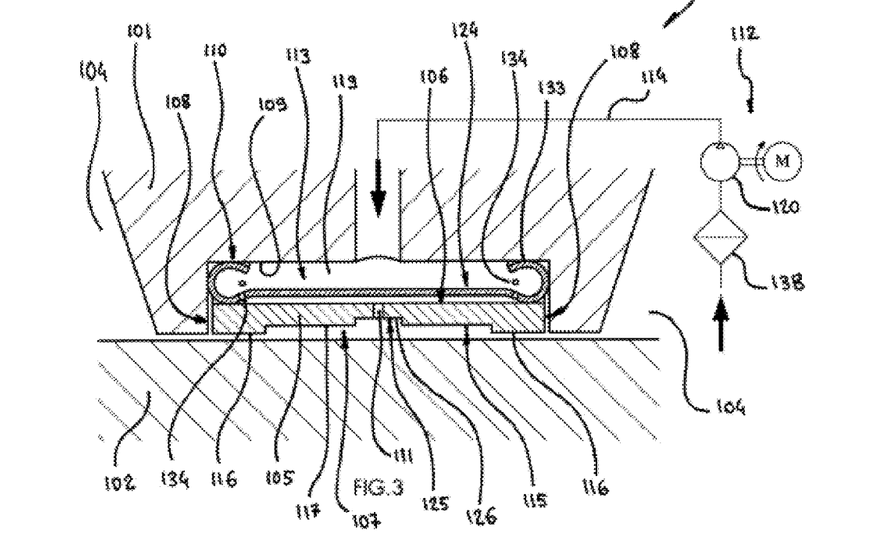
FIGS. 3 and 4 are a diagrammatic cross section and an exploded three-dimensional view, respectively, of the fluid-cushion sealing device according to the invention, the ring groove accommodating an expanding spring which produces by contact a seal between the ring groove and the continuous perforated ring, said spring being moreover provided with fluid dispersion openings in order to constitute ring fluid dispersion means.
Figure 4:
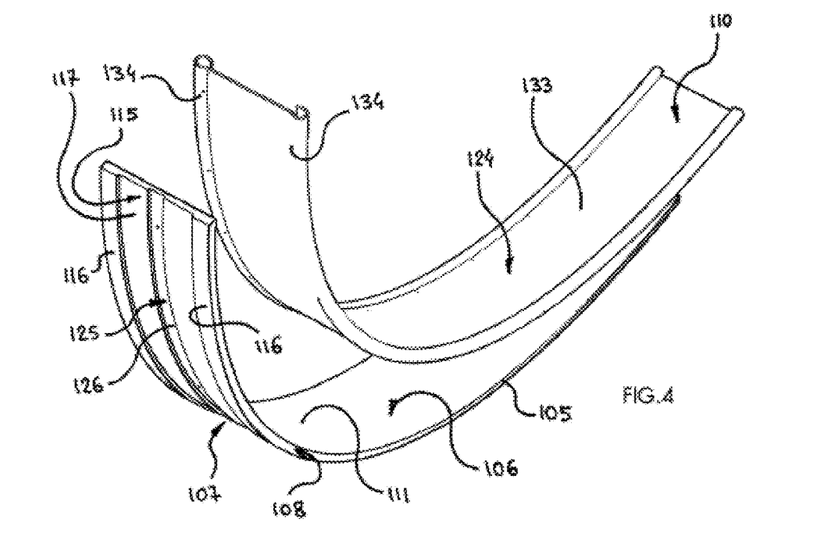

As for FIG. 2, it shows that the continuous perforated ring 105 can consist of a flexible material and include at least one circumferential ring spring 123 which tends to reduce the diameter of said ring 105 if the ring groove 106 is produced in the piston 101, or which tends to increase the diameter of said ring 105 if the ring groove 106 is produced in the cylinder 102. One notes that said flexible material can be an elastomer or a polymer which may or may not have a finer of anti-abrasive or anti-friction particles, while the circumferential ring spring 123 can be included in said material or held on the surface of the latter by means of a groove, a housing or abutments. The circumferential ring spring 123 can be helical like valve rod sealing springs, can be a slit device, or can be of any other type capable of fulfilling the desired function.

From FIGS. 3 to 8, one learns that the pressure distribution chamber 119 can accommodate ring fluid dispersion means 124 which force the ring fluid 113 originating from the pressure transfer circuit 114 to sweep the largest possible area of the internal cylindrical ring surface 106 in the case in which the ring groove 106 is provided in the piston 101 or the largest possible area of the external cylindrical ring surface 107 in the case in which the ring groove 106 is provided in the cylinder 102, before escaping through the calibrated opening 111. This arrangement allows the ring fluid 113 to cool the continuous perforated ring 105, the latter giving up some of its heat to the fluid 113.

Another variant shown in FIGS. 5 and 6 of the fluid-cushion sealing device 100 according to the invention consists in that the ring fluid dispersion means 124 can consist of a dispersion plate 136 accommodated at the bottom of the ring groove 106, at least one of said axial ends of said plate 136 being provided with at least one lateral distribution plate opening or groove 137 which forces the ring fluid 113 originating from the pressure transfer circuit 114 to flow into the pressure distribution chamber 119 by at least one of its axial ends.

In FIG. 2, one also sees that the ring groove 109 can have a radial ring abutment 127 which limits the penetration of the continuous perforated ring 105 into said groove 109, said abutment 127 possibly being—in a non-limiting manner—a cylindrical surface constituting the bottom of the ring groove 109, or at least one circular ridge or raised parts arranged at the bottom of said groove 109, or at least one chamfer or rim provided on at least one of the two edges of said groove 109.

Figure 11:
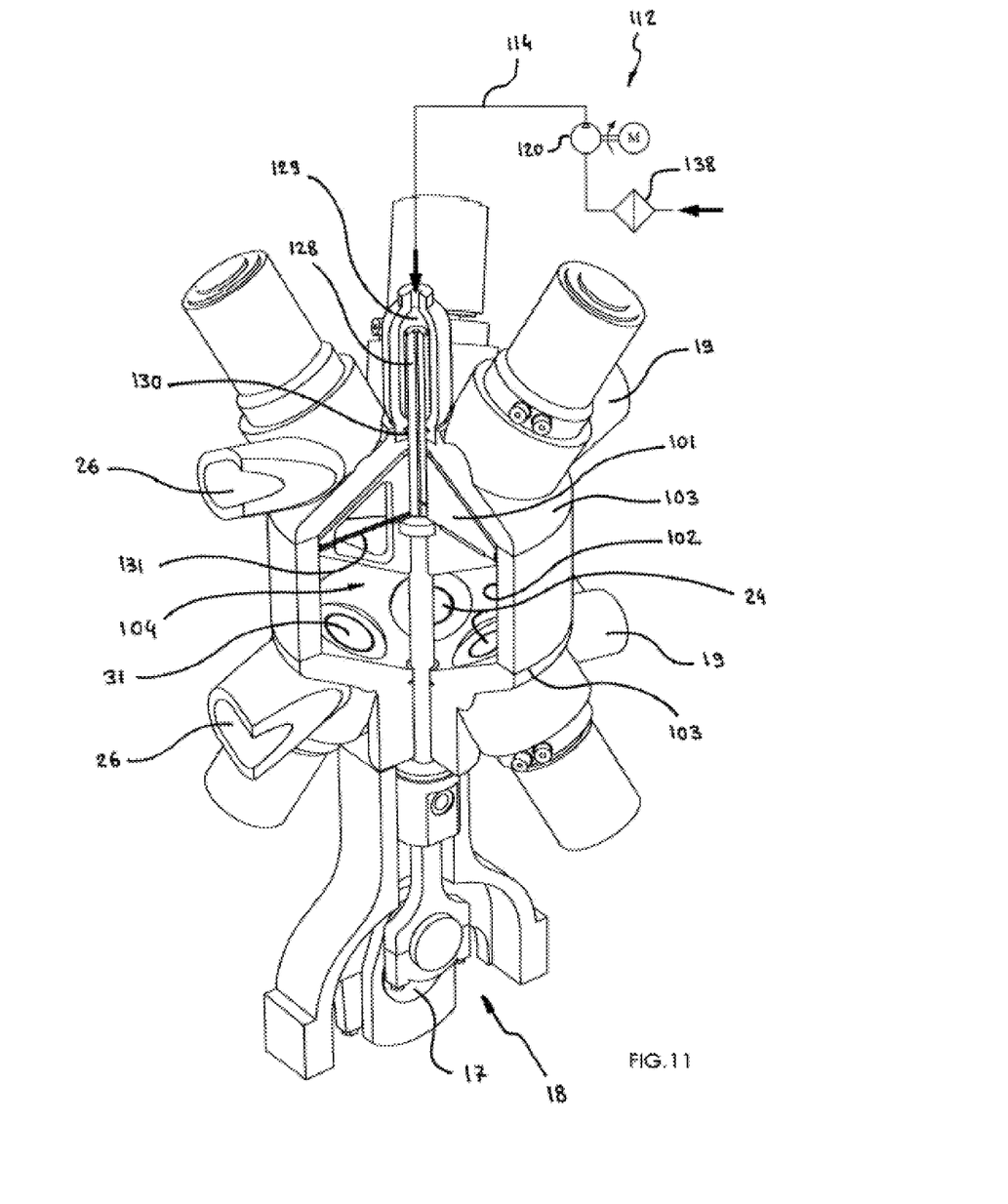
FIG. 11 is a three-dimensional view with cutaway of a portion of a regenerative heat engine whose piston is provided with the fluid-cushion sealing device according to the invention.
Figure 12:
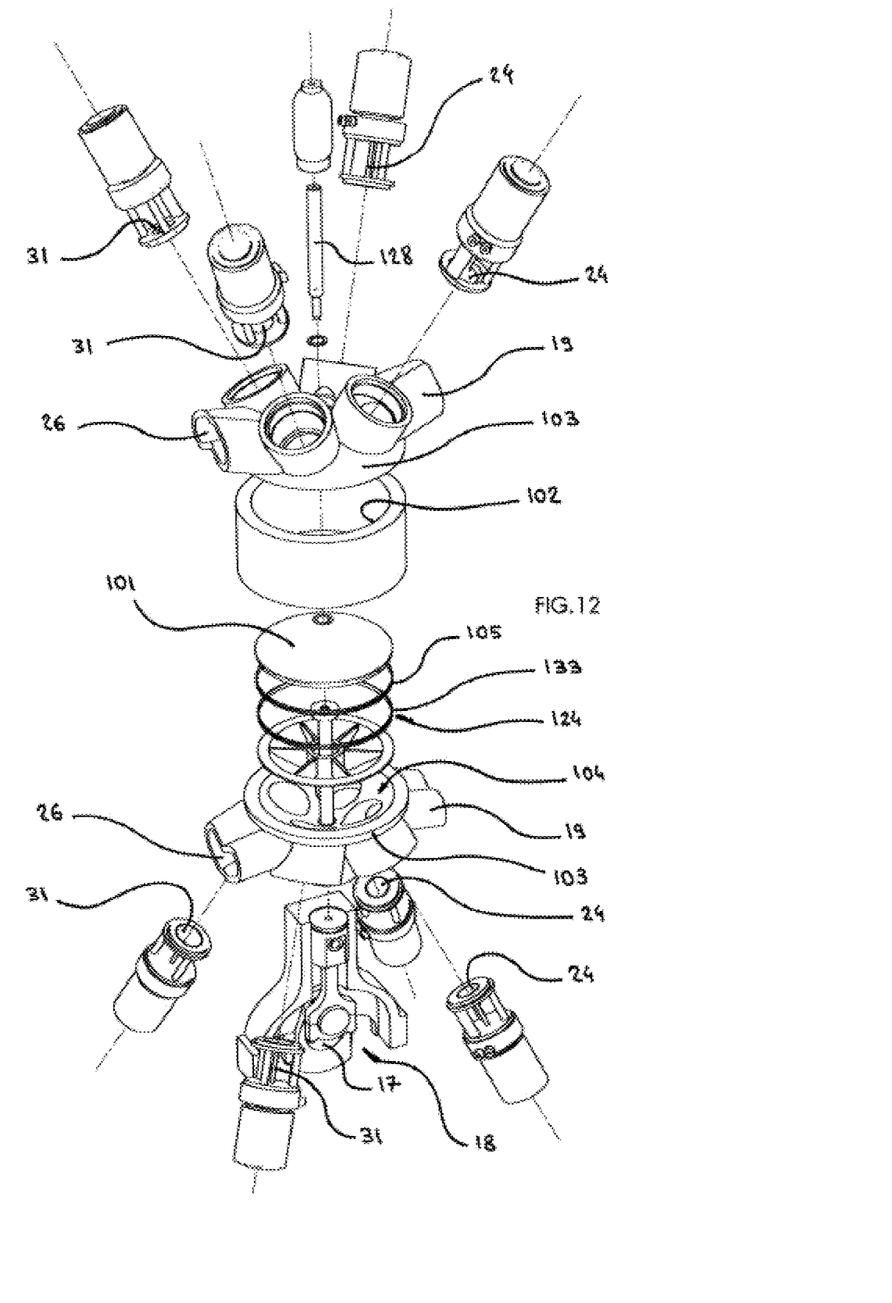
FIG. 12 is an exploded three-dimensional view of a portion of a regenerative heat engine whose piston is equipped with the fluid-cushion sealing device according to the invention.

FIGS. 11 and 12 moreover show that, if the ring groove 109 is provided in the piston 101, the pressure transfer circuit 114 can consist of a pressure intake tube 128 parallel to the cylinder 102 and secured to the piston 101, a first end of said tube 128 leading into the interior of said piston 101, while the second end of said tube 128 leads, via a pressure chamber borehole 130 in which it can move by translation longitudinally and sealingly, into a pressure chamber 129 connected to the pressurized fluid source 112. One notes that the second end of the pressure intake tube 128 which moves by translation in the pressure chamber borehole 130 can comprise a seal which slides in said borehole 130 to produce a seal. Alternatively, the pressure chamber borehole 130 can comprise a seal which slides around said second end of the pressure intake tube 128 to produce a seal.

FIG. 11 shows that the pressure intake tube 128 can be connected to the pressure distribution chamber 119 by at least one radial pressure intake duct 131 which can be produced in the mass of the piston 101 or, which can be added to the latter, for example, by a plating of tubes which may or may not comprise sealing gaskets and/or expanding joints.

One will also note that the pressure chamber 129 can be connected to the pressurized fluid source 112 via a proportional pressure non-return valve which allows the ring fluid 113 to go from said source 112 to said chamber 129 but not from said chamber 129 to said source 112. This particular arrangement makes it possible to use the variation of the volume of the pressure chamber 129 which the back-and-forth movements of the second end of the pressure intake tube 128 produce in order to increase the pressure that prevails in the pressure distribution chamber 119 when the piston 101 is in the vicinity of its top dead center.

In another embodiment variant of the fluid-cushion sealing device 100 according to the invention, FIGS. 3, 4, 7, 8 and 12 illustrate that the ring groove 109 can accommodate an expanding spring 133 which bears against said groove 109 in order to exert a radial force on the internal cylindrical ring surface 106 in the case in which the ring groove 106 is provided in the piston 101, or on the external cylindrical ring surface 107 in the case in which the ring groove 106 is provided in the cylinder said spring 133 possibly being a helical spring, a leaf spring, a wave spring or a spring of a type known to the person skilled in the art.

One notes, particularly in FIGS. 3, 4, 7 and 8, that the expanding spring 133 can produce by contact a seal between the ring groove 109 and the continuous perforated ring 105.

Said figures also show that the expanding spring 133 can be provided with at least one fluid dispersion opening 134 and/or with at least one fluid dispersion groove 135 so as to form, with said opening 134 and/or said groove 135, the ring fluid dispersion means 124.

Operation of the Invention

Figure 9:
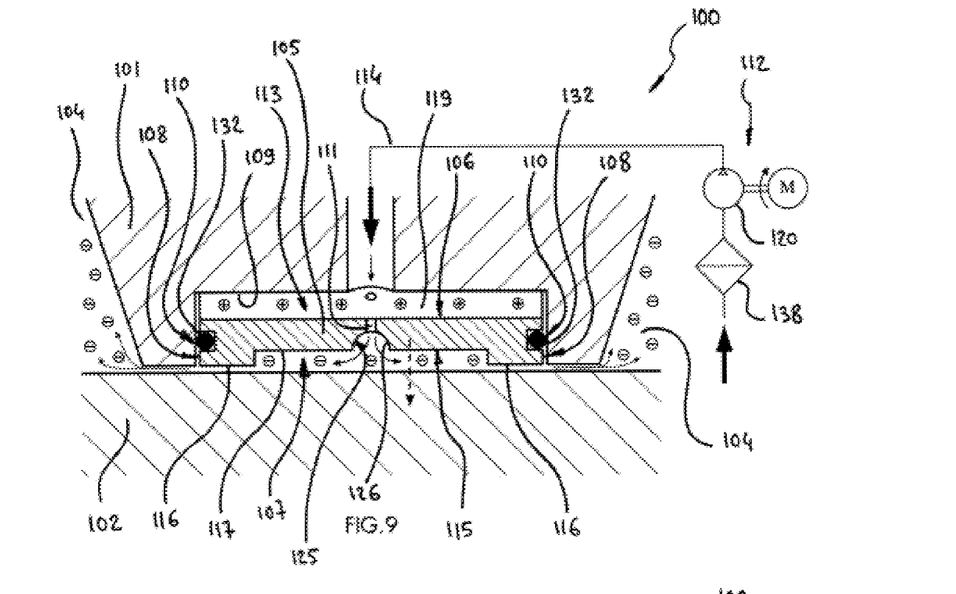
FIGS. 9 and 10 are diagrammatic cross-sectional views that illustrate the operation of the fluid-cushion sealing device according to the invention, the ring sealing means consisting of an O-ring seal.
Figure 10:
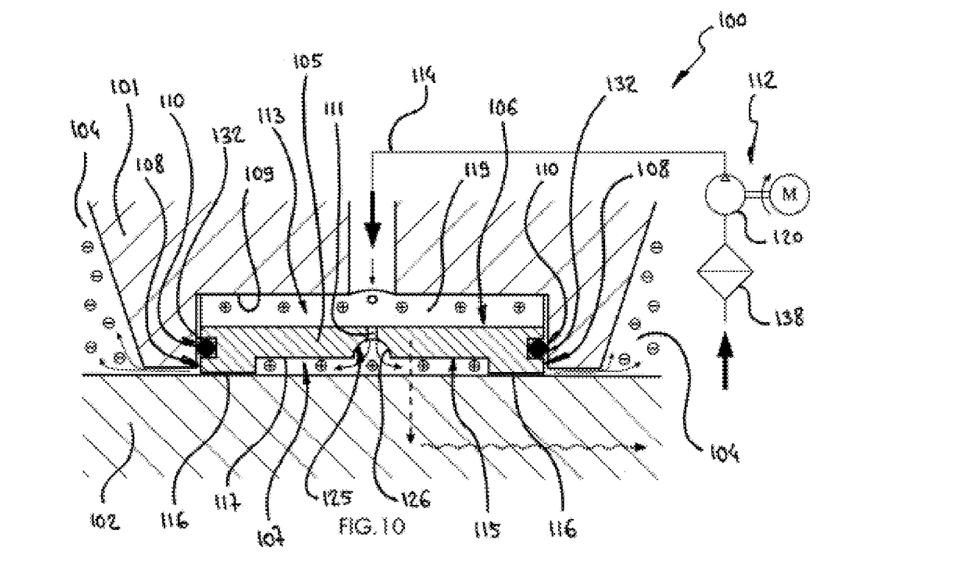

The operation of the fluid-cushion sealing device 100 according to the invention is understandable in view of FIGS. 9 and 10 which show, in particular, ring sealing means 110 consisting of an O-ring seal 132.

According to the non-limiting embodiment example of the sealing device 100 shown in FIGS. 9 and 10, the ring groove 109 is provided the piston 101 and in the cylinder 102. Consequently, the pressure distribution chamber 119 is located on the 106 side of the internal cylindrical ring surface.

One notes that in said FIGS. 9 and 10 symbols "+" and "−" enclosed by a circle have been added, illustrating the different between the pressure prevailing in the pressure distribution chamber 119, on the one hand, and the pressure prevailing in the pressure distribution groove 126, the counter-pressure groove 117, and the chamber to be sealed 104, on the other hand.

We will assume that the maximum pressure prevailing in the chamber to be sealed 104 is twenty bars, while the pressurized fluid source 112 produces a flow of ring fluid 113 whose maximum pressure is forty bars.

FIG. 9 shows the fluid-cushion sealing device 100 according to the invention, when the pressurized fluid source 112 is just starting to deliver ring fluid 113 and the pressure distribution chamber 119 is just starting to increase in pressure. We will assume that at this stage the pressure prevailing in the chamber to be sealed 104 is still only one absolute bar.

One observes that the pressure distribution chamber 119 having been sealed, in particular by means of the O-ring 132, the ring fluid 113 has no exit other than through the calibrated opening 111 to escape from said chamber 119. In the operating stage of the fluid-cushion sealing device 100 according to the invention illustrated in FIG. 9, the full flow of ring fluid 113 originating from the pressurized fluid source 112 has not yet been established, no that the pressure prevailing in the pressure distribution chamber 119 is only ten bars.

In spite of the fact that the pressure of forty bars has not yet been generated by the pressurized fluid source 112, one observes that the continuous perforated ring 105 is starting to expand in spite of the escape of ring fluid 113 through the calibrated opening 111, since the pressure prevailing in the pressure distribution chamber 119 is higher than the pressure prevailing in the pressure distribution groove 126, the counter-pressure groove 117, and the chamber to be sealed 104.

The expanding of the continuous perforated ring 105 is symbolized by the dotted-line arrow. The flow of ring fluid 113 which escapes through the calibrated opening 111 joins with the chamber to be sealed 104 via the pressure distribution groove 126, the counter-pressure groove, and the interstice formed by the clearance left between the piston 101 and the cylinder 102, respectively.

One will also note that the cross section of the calibrated opening 111 and the flow of ring fluid 113 generated by the pressurized fluid source 112 are calculated so that the pressure of forty bars—when it has indeed been generated by said source 112—can be maintained in the pressure distribution chamber 119, in spite of the ring fluid 113 escaping through the calibrated opening 111. This is equivalent to saying that, if no obstacle limits the expanding of the continuous perforated ring 105, the latter receives enough flow of ring fluid 113 from the pressurized fluid source 112 to expand as much as it would if it were perfectly sealed, that is to say as much as it would if it did not have a calibrated opening 111.

As for the radial thickness of the continuous perforated ring 105, it is calculated so that—taking into account the resilience of the material constituting said ring 105—, when a pressure of forty bars is applied to the internal cylindrical ring surface 106, the external diameter of the continuous perforated ring 105 is at least equal to and even greater than the internal diameter of the cylinder 102.

With the pressure rising gradually in the pressure distribution chamber 119, the diameter of the continuous perforated ring 105 increases until the fluid-cushion carrying surfaces 116 are a very short distance from the wall of the cylinder 102. This is what is represented in FIG. 10.

At this operating stage of the fluid-cushion sealing device 100 according to the invention, a significant pressure loss is created between the fluid-cushion carrying surfaces 116 and the cylinder 102, said loss opposing the passage of the ring fluid 113. Consequently, the pressure that prevails in the pressure distribution groove 126 and the counter-pressure groove 117 increases to the point of being close to the pressure prevailing in the pressure distribution chamber 119. From this it results that the pressure prevailing in said chamber 119 no longer exerts a radial force on the continuous perforated ring 105 except at the fluid-cushion carrying surfaces 116. Consecutively to this, due to the resilience conferred to it by the properties of a spring, which makes it resistant to expanding, the continuous perforated ring 105 retracts, which has the effect, on the one hand, of reducing the load loss between the fluid-cushion carrying surfaces 116 and the cylinder 102, and, on the other hand, of lowering the pressure prevailing in the pressure distribution groove 126 and the counter-pressure groove 117, which again causes the continuous perforated ring 105 to expand.

As can be observed, the constrictive force resulting from the stiffness of the continuous perforated ring 105, which opposes the expanding of the latter, on the one hand, and the load loss created between the fluid-cushion carrying surface 116 and the cylinder 102, on the other hand, lead to a relatively unstable situation f the continuous perforated ring 105. Indeed, when the diameter of said ring 105 increases, the conditions that led to said increase in diameter disappear, while, when the diameter of said ring 105 decreases, the conditions that lead to said increase are again all present.

From this it results that t fluid-cushion carrying surfaces 116 have no choice but to find a relatively stable intermediate position at a very short distance from the cylinder 102. Said distance results from the initial clearance between the piston 101 and the cylinder 102, from the pressure that prevails in the pressure distribution chamber 119, from the stiffness of the continuous perforated ring 105, and from the total axial length of the fluid-cushion carrying surfaces 116 relative to the total axial length of the internal cylindrical ring surface 106 which is exposed to the pressure of the ring fluid 113. Said distance also results from the depth of the counter-pressure groove 117, which itself represents an additional load loss.

According to the operating example considered here, once the pressure of forty bars is established in the pressure distribution chamber 119, the distance between the fluid-cushion carrying surfaces 116 and the cylinder 102 is on the order of either several microns or on the order of one micron or even a traction of a micron. It is this short distance which, combined with a flow of ring fluid 113 that always goes from the counter-pressure recess 115 towards the chamber to be sealed 104 and not in the opposite direction, produces a very tight seal between the piston 101 and the cylinder 102.

One observes that, taking into consideration the particular operating mode of the fluid-cushion sealing device 100 according to the invention, the continuous perforated ring 105 naturally tends to become centered in the cylinder 102 and to adjust for any defects in circularity or cylindricity of said cylinder 102. Indeed, the position of the continuous perforated ring 105 results from an equilibrium between, first, the general constrictive force of said ring 105 given by the stiffness of the latter and, second, the local radial forces applied at each point of the periphery and of the axial length of the continuous perforated ring 105, said forces resulting from the aerodynamic interaction between the fluid-cushion carrying surfaces 116 and the cylinder 102.

One also notes that the design of the fluid-cushion sealing device 100 according to the invention leaves numerous possibilities for adaptation to each application. For example, all things being equal otherwise, the cross section of the calibrated opening 111 makes it possible to regulate the distance left between the fluid-cushion carrying surfaces 116 and the cylinder 102, said distance being possibly also regulated by the stiffness of the continuous perforated ring 105 which depends, in particular, on its thickness.

It is easy to conclude from the operation that has just been described that it is absolutely necessary that the pressure generated by the pressurized fluid source 112 is always greater than that prevailing in the chamber to be sealed 104. This does not rule out the possibility—over sufficiently long time scales—to adapt the pressure generated by the pressurized fluid source 112 to the maximum pressure occurring in the chamber to be sealed 104. However, one notes that, if the pressure chamber 129 has a proportional pressure non-return valve, the pressure that prevails in the pressure distribution chamber 119 can vary over short time scales like the pressure prevailing in the chamber to be sealed 104. This strategy can be retained, for example, if the application in which the fluid-cushion sealing device 100 according to the invention is used is a pneumatic compressor.

Thus, one sees that the fluid-cushion seating device 100 according to the invention provides access to new possibilities that are not accessible to conventional sealing devices for pistons.

In particular, it becomes possible to design a regenerative e e by means of volumetric piston machines whose general principle and organization is similar to those of Brayton cycle regenerative engines commonly implemented by means of compressors and centrifugal turbines. One will also note that said regenerative engine is very different from engines having compressors and centrifugal turbines both in terms of its embodiment as well as in terms of innovations that it uses so that it is both producible and efficient. Such a piston regenerative engine requires that the operating temperature of the cylinder 102 and of the piston 101 be on the order of a thousand degrees Celsius and more. At such a temperature, the use of any lubrication by oil whether of a segment or of a ring is ruled out. Moreover, whatever the material used is to produce said cylinder 102 and said piston 101, for example, a ceramic based on alumina, zirconium or silicon carbide or any other material, at such a temperature, any contact between said cylinder 102 and a sealing segment or gasket is impossible.

However, the fluid-cushion sealing device 100 according to the invention is compatible with such operating conditions. Indeed, the continuous perforated ring 105 never comes in contact with the cylinder 102, since it is separated from the latter by a film of ring fluid 113 which can be—as a non-limiting example—air of which the atmosphere is made. Moreover, the continuous perforated ring 105 is constantly cooled by flow of ring fluid 113 which passes through it and which sweeps the internal cylindrical ring surface 106 and the external cylindrical ring surface 107. In this regard, it must be recalled that, in order to assist this cooling, the pressure distribution chamber 119 can accommodate ring fluid dispersion means 124 such as those shown in FIGS. 3 to 8. Said cooling, in particular, makes it possible to use a continuous perforated ring 105 made of steel having the desired mechanical resistance, without exceeding the tempering temperature of said steel which is only a few hundred degrees Celsius. The use of a continuous perforated ring 105 made of steel heated to several hundreds of degrees in a cylinder 102 made of ceramic heated to more than a thousand degrees Celsius moreover makes it possible to control the operating clearance between said ring 105 and said cylinder 102 under good conditions, which is easily demonstrated by calculation. This is due, in particular, to the expanding coefficient of steel which is higher than that of the ceramic whether or not said steel is coated with a protective layer that protects it against oxidation.

One also notes that the cooling of the continuous perforated ring 105 has, as a corollary, the local heating of the ring fluid 113, which makes it possible to increase the volume of said fluid 113. This advantageously makes it possible to reduce the flow of fluid 113 produced by the pressurized fluid source 112, while at the same time allowing the extensible continuous fluid-cushion sealing device 100 according to the invention to operate under the desired conditions. One also notes that it is possible to regulate the temperature of the ring fluid 113 before introducing it into the pressure chamber 129, which makes it possible to regulate operating temperature of the continuous perforated ring 105 and thus the operating clearance between said ring 105 and the cylinder 102.

One also observes that the flow of ring fluid 113 which flows between the fluid-cushion carrying surfaces 116 and the cylinder 102 ensures the continual cleaning of the latter. Thus, solid particles and residues of any type cannot adhere to the cylinder 102. In addition, it is not possible for a particle originating from the chamber sealed 104 to pass between the fluid-cushion carrying surfaces 116 and the cylinder 102, since the pressure of the gases in said chamber 104 is lower than the pressure prevailing in the pressure distribution chamber 119. One will also note that, in order to guarantee an optimal operation of the fluid-cushion carrying surfaces 116, it is possible to provide a ring fluid filter 138 which removes any particle whose diameter is, for example, greater than one micron from the ring fluid 113 before said fluid 113 is introduced into the pressure distribution chamber 119.

As a consequence of what has just been said, the fluid-cushion sealing device 100 according to the invention makes it possible, in particular, to produce a high-yield regenerative heat engine whose cylinder 102 which is exposed to high temperatures is shown in FIGS. 11 and 12. One observes in said figures that said heat engine comprises, in particular, two cylinder heads 103 and a piston 101 connected to a power output shaft 17 by mechanical transmission means 18. The piston 101, the cylinder 102 and the cylinder heads 103 define two chambers to be sealed 104 each of which can be put in connection either with a hot gas intake duct 19 by intake metering valves 24 or with a low-pressure gas exhaust duct 26 by exhaust valves 31.

In FIGS. 11 and 12, one notes the presence of the pressure intake tube 8 oriented parallel to the cylinder 102 and secured to the piston 101, a first end of said tube 128 leading to the interior of the piston 101, while the second end of said tube 128 leads, via the pressure chamber borehole 130 in which it can move by translation longitudinally and seating y, into the pressure chamber 129 which is connected is the pressurized fluid source 112 by the pressure transfer circuit 114. One also observes—particularly in FIG. 11—that the pressure intake tube 128 is connected to the pressure distribution chamber 119 by a radial pressure intake duct 131 added in the piston 101.

The possibilities of the fluid-cushion sealing device 100 according to the invention are not limited to the applications that have just been described, and moreover it must be understood that the above description was given only as an example and that it in no way limits the scope of said invention which one would not exceed by replacing the details of execution described by any other equivalent.

The invention claimed is:

1. A fluid-cushion sealing device for a piston, wherein:
said sealing device is configured to move in longitudinal translation in a cylinder, along an axis of the cylinder, said piston and said cylinder defining, with at least one cylinder head, a chamber to be sealed, wherein the sealing device includes:
at least one continuous perforated ring which comprises an internal cylindrical ring surface, an external cylindrical ring surface, and two axial ring surfaces, said ring being configured to be accommodated in at least one ring groove provided in the piston or in the cylinder, while said ring is capable of moving radially in the ring groove without being able to leave the ring groove, wherein a diameter of the continuous perforated ring is variable and said diameter increases or decreases relative to said groove under pressure of a ring fluid;
a ring seal that produces a seal between each axial ring surface and the ring groove, so that the ring groove defines, with the continuous perforated ring, a pressure distribution chamber connected by a transfer circuit to a pressurized fluid source;
at least one calibrated opening which passes right through the continuous perforated ring in its radial thickness;
at least one fluid-cushion carrying surface which the continuous perforated ring comprises, said carrying surface being arranged on the opposite side from the pressure distribution chamber.

2. The fluid-cushion sealing device according to claim 1, wherein the ring groove is provided in the piston, further comprising an axially blind counter-pressure recess provided recessed on the external cylindrical ring surface, so that the surface that is not occupied by the counter-pressure recess of the external cylindrical ring surface which receives said recess constitutes the fluid-cushion carrying surface.

3. The fluid-cushion sealing device according to claim 1, further comprising a counter-pressure recess that consists of a counter-pressure groove of small depth that is approximately centered on the axial length of the external cylindrical ring surface or of the internal cylindrical ring surface which receives said recess, said counter-pressure groove being produced over the entire circumference of said external cylindrical ring surface or of said internal cylindrical ring surface.

4. The fluid-cushion sealing device according to claim 1, wherein, if the ring groove is provided in the piston, the pressure transfer circuit consists of a pressure intake tube parallel to the cylinder and secured to the piston, a first end of said tube leading into the interior of said piston, while the second end of said tube opens, via a pressure chamber borehole in which it can move by translation longitudinally and sealingly, into a pressure chamber connected to the pressurized fluid source.

5. The fluid-cushion sealing device according to claim 4, wherein the pressure intake tube is connected to the pressure distribution chamber by at least one radial pressure intake duct.

6. The fluid-cushion sealing device according to claim 4, wherein the pressure chamber is connected to the pressurized fluid source by a proportional pressure non-return valve which allows the ring fluid to go from said source to said chamber, but not from said chamber to said source.

* * * * *